US008495595B2

(12) United States Patent
Andrade et al.

(10) Patent No.: US 8,495,595 B2
(45) Date of Patent: Jul. 23, 2013

(54) METHOD OF SELECTING AN EXPRESSION EVALUATION TECHNIQUE FOR DOMAIN-SPECIFIC LANGUAGE COMPILATION

(75) Inventors: Henrique Andrade, Croton-on-Hudson, NY (US); Bugra Gedik, White Plains, NY (US); Mark Mendell, Toronto (CA); Howard W. Nasgaard, Markham (CA); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 12/749,947

(22) Filed: Mar. 30, 2010

(65) Prior Publication Data

US 2011/0246972 A1 Oct. 6, 2011

(51) Int. Cl.
*G06F 9/45* (2006.01)

(52) U.S. Cl.
USPC .......................... 717/137; 717/136; 717/140

(58) Field of Classification Search
None
See application file for complete search history.

(56) References Cited

U.S. PATENT DOCUMENTS

| | | | | |
|---|---|---|---|---|
| 5,613,117 A * | 3/1997 | Davidson et al. | | 717/144 |
| 7,555,747 B1 * | 6/2009 | Agesen | | 717/154 |
| 8,122,292 B2 * | 2/2012 | Nanjundaswamy | | 714/34 |
| 2003/0028864 A1 * | 2/2003 | Bowen | | 717/141 |
| 2006/0212855 A1 * | 9/2006 | Bournas et al. | | 717/140 |
| 2007/0038985 A1 * | 2/2007 | Meijer et al. | | 717/137 |
| 2008/0046868 A1 * | 2/2008 | Tsantilis | | 717/136 |
| 2008/0052685 A1 * | 2/2008 | Jeong et al. | | 717/136 |
| 2008/0127100 A1 * | 5/2008 | O'Farrell et al. | | 717/125 |
| 2008/0222616 A1 * | 9/2008 | Cheng et al. | | 717/137 |
| 2009/0055809 A1 * | 2/2009 | Campbell | | 717/140 |
| 2010/0131934 A1 * | 5/2010 | Kim et al. | | 717/137 |
| 2010/0325607 A1 * | 12/2010 | Meijer et al. | | 717/106 |
| 2011/0047415 A1 * | 2/2011 | Nanjundaswamy | | 714/37 |
| 2011/0131559 A1 * | 6/2011 | Young et al. | | 717/145 |
| 2011/0145801 A1 * | 6/2011 | Kaplinger et al. | | 717/137 |

OTHER PUBLICATIONS

"Optimize Options—Using the GNU Compiler Collection (GCC)", Mar. 5, 2009, downloaded from Internet Archive WaybackMachine—http://gcc.gnu.org/onlinedocs/gcc/Optimize-Options.html.*
Andrew Berlin, "Partial Evaluation Applied to Numerical Computation", 1990, ACM 089791-368-X190/0006/0139.*
Hutchins, "Partial Evaluation + Reflection = Domain Specific Aspect Languages", 2006, DSAL Workshop, GPCE 2006 Oct. 23, 2006, Portland OR.*
Leijen et al., "Domain Specific Embedded Compilers", 1999, Proceedings of DSL'99: The 2nd Conference on Domain-Specific Languages, Austin, Texas, USA, Oct. 3-6, 1999, pp. 1-15.*
Gedik et al. "SPADE: The System S Declarative Stream Processing Engine," SIGMOD Conference 2008: 1123-1134.

* cited by examiner

*Primary Examiner* — Thuy Dao
*Assistant Examiner* — Stephen Berman
(74) *Attorney, Agent, or Firm* — F. Chau & Associates, LLC (57) ABSTRACT

A method and computer program product for selecting an expression evaluation technique for domain-specific language (DSL) compilation. An application written in DSL for a programming task is provided, the application including a plurality of components configured by expressions. A technique that most quickly implements the programming task is selected from a plurality of techniques for evaluating the expressions. The DSL application is compiled in accordance with the selected expression evaluation technique to generate general-purpose programming language (GPL) code.

16 Claims, 10 Drawing Sheets

| APPROACH/METRIC | time-to-compile | time-to-run | time-to-start-up |
|---|---|---|---|
| embed | worst | good | best |
| fold & embed | worst | best | best |
| fold & extract | good | best | good |
| interpret | best | worst | bad |
| jit-compile | best | good/best | worst |

FIG. 8

| TASK | performance debugging | semantic debugging | syntactic debugging | deployment performance | deployment performance with adaptation | deployment performance with mutation |
|---|---|---|---|---|---|---|
| time-to-compile | important | important | important | unimportant | unimportant | important |
| time-to-run | important | unimportant | unimportant | important | important | important |
| time-to-start-up | important | important | unimportant | unimportant | important | unimportant |
| BEST TECH. | fold & extract | fold & extract | interpret jit-compile | fold & embed fold & extract | fold & embed | jit-compile |

METHOD OF SELECTING AN EXPRESSION EVALUATION TECHNIQUE FOR DOMAIN-SPECIFIC LANGUAGE COMPILATION

GOVERNMENT INTERESTS

This invention was made with Government support under Contract No.: H98230-07-C-0383 awarded by the U.S. Department of Defense. The Government has certain rights in this invention.

BACKGROUND

1. Technical Field

The present invention relates to domain-specific language (DSL) compilation.

2. Discussion of the Related Art

In software development, a domain-specific language (DSL) is a programming language or specification language dedicated to a particular problem domain, a particular problem representation technique, and/or a particular solution technique. DSLs are compiled into general-purpose programming languages, for example, C or JAVA™, for speed and portability, since many general-purpose programming languages have a large body of existing technology and tools already invested in them.

BRIEF SUMMARY

In accordance with an exemplary embodiment of the present invention, provided is a framework for evaluating time-tradeoffs of differing domain-specific language (DSL) compilation approaches, thereby enabling a programming task to be paired with a DSL compilation approach best suited for saving time.

Exemplary embodiments of the present invention provide a method and computer program product for selecting an expression evaluation technique for DSL compilation. An application written in DSL for a programming task is provided/received, the application including a plurality of components configured by expressions. A technique that most quickly implements the programming task is selected from a plurality of techniques for evaluating the expressions. The DSL application is compiled in accordance with the selected expression evaluation technique to generate general-purpose programming language (GPL) code.

DETAILED DESCRIPTION

An aspect of compiling a domain-specific language (DSL) application down to a general-purpose programming language (GPL), e.g., code generation, is its interplay with expression evaluation. Expression evaluation is a fundamental part in compiling component-based applications written using DSLs. Such applications have a large number of reusable components that are configured via expressions. Such expressions are evaluated during execution time. There are various techniques to achieve expression evaluation, with varying amounts of work done at compile-time versus start-up time versus run-time. Application of these different techniques may result in different time trade-offs, where more or less time is spent at each of these steps.

In this disclosure, provided is a framework for evaluating expressions in DSLs, wherein depending on the context and task-at-hand, different approaches can be selected as the expression evaluation strategy to optimize time trade-offs involved in development and deployment of applications written in DSLs. The time trade-offs include, but are not limited to: time-to-compile, e.g., time taken to compile the DSL application down to machine code; time-to-start-up, e.g., time taken to load the DSL application and make it ready for execution; and time-to-run, e.g., time taken to complete a task, once the application is started.

In the following description, stream processing will be used as the target domain, and SPADE, as the target domain-specific programming language. However, the present invention is not limited thereto. SPADE stands for "Stream Processing Application Declarative Engine," a programming language and compilation infrastructure specifically built for streaming systems. The SPADE programming model is more fully described by Gedik et al. in "SPADE: The System S Declarative Stream Processing Engine," SIGMOD Conference 2008: 1123-1134. SPADE is also referred to as the Stream Processing Language (SPL). Embodiments of the invention may be used with the INFOSPHERE STREAMS stream processing system, commercially available from International Business Machines Corporation of Armonk, N.Y.

Stream computing is an emerging paradigm of computation that is targeted at coping with large numbers of information sources and high rates of events, typically produced live. It consists of assimilating data readings that are streams of events, analyzing the streaming data on the fly, and producing actionable results, possibly in stream format as well. This represents a move away from the "store and then process" model of traditional data management systems, toward the "on-the-fly processing" of near real-time data.

In a stream processing system, applications take the form of data flow graphs. A data flow graph consists of operators, interconnected by streams. The individual operators implement algorithms for data analysis, such as parsing, filtering, feature extraction, and classification.

SPADE is a rapid application development language for building stream processing applications. It provides three key functionalities.

One, it is a language that composes parameterizable distributed stream processing applications, in the form of data flow graphs. The SPADE language provides a stream-centric, operator-level programming model that is used to compose operators into logical data flow graphs by configuring each operator via custom expressions and connecting them to each other via streams.

Two, it is a type-generic streaming operator model, which captures the fundamental concepts associated with streaming applications, such as windows on input stream, aggregation functions on windows, output attribute assignments, punctuation markers in streams, etc. SPADE comes with a stream relational toolkit of operators, which implement relational algebra-like operations in the streaming context.

Three, it provides support for extending the language with new type-generic, highly configurable, and reusable operators. This enables third parties to create application or domain specific toolkits of operators.

```
[SPADE program]

stream<string buyer, string item, float price>
    Quote = TCPSource( ) {
        param
            address  : "195.45.67.4";
            port     : 15678;
    }
stream<string seller, string item, float price>
    Bid = TCPSource( ) {
        param
            address  : "175.24.78.43";
            port     : 44567;
    }
stream<string buyer, string seller, string item, float price>
    Sale = Join(Bid; Quote) {
        window  Bid      : sliding, time(30);
                Quote    : sliding, count(50);
        param   match    : Bid.item == Quote.item &&
                           Bid.price >= Quote.price;
        output  Sale     : item = Bid.item, price = Bid.price;
    }
```

Figure 1:
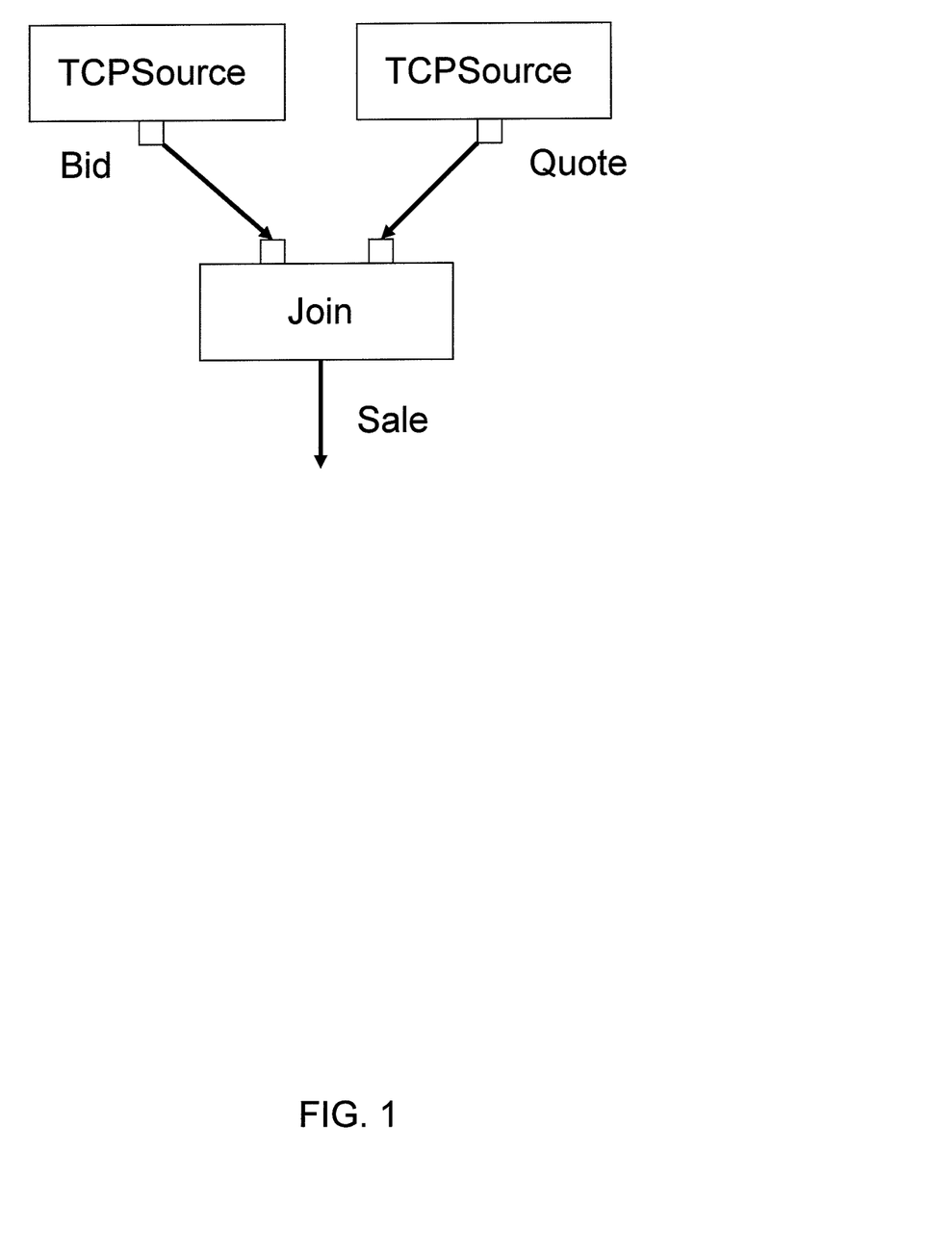
FIG. 1 is an example Stream Processing Application Declarative Engine (SPADE) graph.

An example SPADE application is illustrated by the program above and a simple graph consisting of three operators, namely two Source operators, and a Join operator, shown in FIG. 1. A few properties of this application, which are relevant to the present invention, will now be noted.

First, this is a component-based application, where operators serve as components. An important aspect of component-based applications is reuse, where the same component is used in different contexts. An example of this is the TCP-Source operator that is used twice in the above SPADE program.

Second, in component-based applications, individual components are usually parameterizable and their different instances could be configured differently. In the above SPADE program, the two TCPSource operators are actually instances of a common TCPSource operator, which are configured differently, via the 'address' and 'port' parameters.

Third, configuration of components involves parameterization via expressions. In the above SPADE program, the instance of the Join operator is configured via a match parameter that specifies an expression to indicate the conditions under which pairs of data items are considered matching from the perspective of this Join operator instance.

The expressions that are used to configure different operators in SPADE (or any other DSL compiled down to a GPL) are evaluated during execution time. There are various ways of achieving this, as will be enumerated shortly. Different approaches to expression evaluation have different characteristics in terms of the time spent performing various stages of getting an application to run. These include the following.

Time-to-compile. This is a major concern if the program changes often and has to be recompiled frequently. For example, in the context of SPADE and streaming applications, compilation time becomes a crucial factor during application development. This is because the process of development involves making frequent changes and testing the impact of those changes, triggering the rebuilding of the application.

Time to start-up. This is a major concern in applications that need to be launched often to adapt to changes in the workload characteristics or application-level configuration parameters. For example, in the context of SPADE and streaming applications, start-up time becomes a crucial factor for dynamic load balancing, where more instances of an application or application components are brought up dynamically to adapt to varying system load and stream rates.

Time-to-run. This is a major concern if performance is a critical part of the requirements of an application. In the context of SPADE and streaming applications, the long-running nature of tasks diminishes the importance of time it takes to compile in many deployment scenarios, whereas the runtime performance of the application is a critical aspect for low-latency, high-throughput applications.

Hereinafter several techniques for evaluating expressions according to the present invention will now be described. These techniques are exemplified using the SPADE language.

In the first expression evaluation technique according to an exemplary embodiment of the present invention, hereinafter referred to as the "embed technique", expressions are compiled into native processor instructions, and then, executed by the processor's hardware at run-time.

Figure 2:
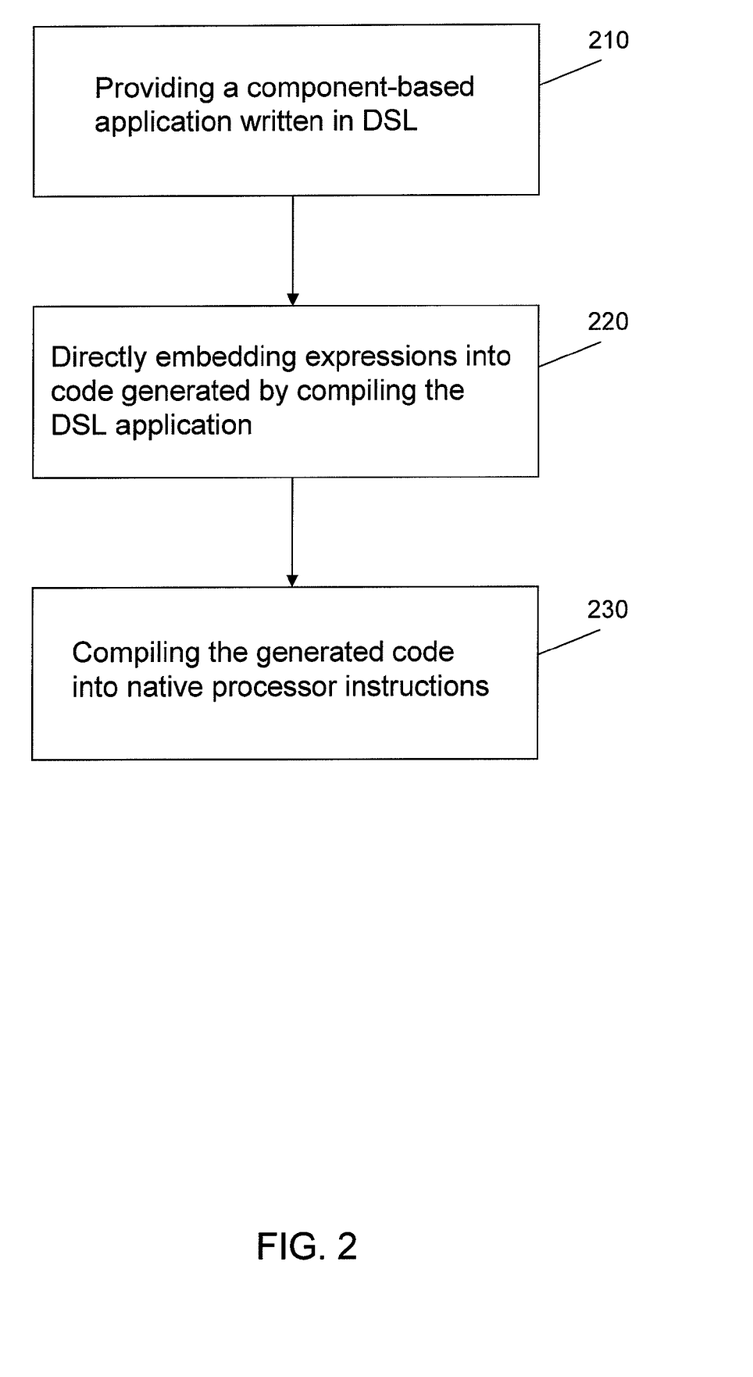
FIG. 2 is a first expression evaluation technique according to an exemplary embodiment of the present invention.

For example, as shown in FIG. 2, in response to providing an application written in DSL, wherein the application includes components configured via expressions (210), expressions that are used to parameterize the components are directly embedded into the code generated by compiling the DSL application down to a GPL (220). Although a component-based system where components are configured via expressions is discussed here, the DSL application does not necessarily include only expressions, thus there could be other kinds of code generated based on the DSL application. Then, the generated code is compiled into native instructions via the GPL's compiler (230). From the time-to-run perspective, this is an effective approach, as the expressions are executed natively by the processor's hardware. However, this is a costly solution in terms of time-to-compile. To see this, consider the following two SPADE operator instances:

```
stream<string name, int price> B = Functor(A)
    { param filter A.price >= 50 }
stream<string name, int price> C = Functor(A)
    { param filter A.price >= 60 }
```

In this example, a DSL compiler, in this case the SPADE compiler, ends up generating code that looks slightly different for these two operator instances, due to the differing literal values (50 and 60) in the filter expressions (A.price>=50 and A.price>=60). In an application where there are a large number of such expressions differing slightly from each other, the amount of code generated and thus the time it takes to compile the generated code into native instructions can potentially be very long.

Figure 3:
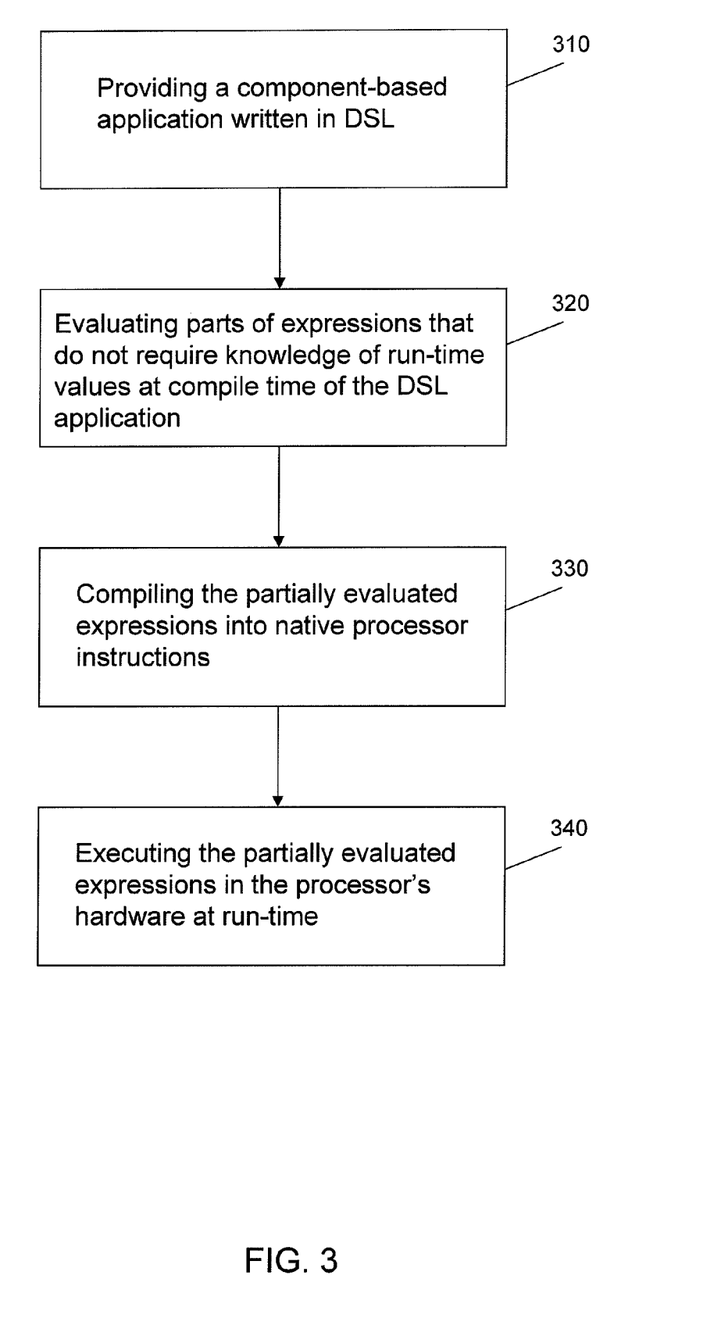
FIG. 3 is a second expression evaluation technique according to an exemplary embodiment of the present invention.

In the second expression evaluation technique according to an exemplary embodiment of the present invention, hereinafter referred to as the "fold & embed technique", as shown in FIG. 3, in response to providing a component-based application written in DSL (310) parts of expressions that do not require knowledge of run-time values are partially evaluated at compile-time (320). The resulting partially evaluated expressions are then compiled into native processor instructions (330) and executed by the processor's hardware at run-time (340).

This is an improvement over the embed technique, wherein sub-expressions are evaluated at compile time and replaced with their literal values before being embedded into the generated code. Because of the additional semantic knowledge available to the DSL compiler, it can be advantageous to perform this optimization before generating the code to be compiled by the target language compiler. This approach may improve time-to-run over the embed technique, but at the cost of further increasing the time-to-compile. Take the following SPADE example.

```
stream<string name, int price> C = Functor(A)
    { param filter A.price >= pow(2,6); }
```

In this example, the SPADE compiler is able to convert the filter expression into $port0.get_price( )>=64 and embed that into the generated code (C++ in SPADE's case). Here a function call is simplified into a literal, which can be done as long as the function is pure. Note that the function always evaluates to the same result values given the same argument value(s) and evaluation of the result does not cause any semantically observable side effect or output. Overall, this approach suffers from the same deficiency of the previous one (long time-to-compile), as it results in generating different code for expressions that only differ in their literal sub-expressions. On the other hand, it is even faster than the previous approach in terms of time-to-run due to compile time evaluation of sub-expressions that do not depend on run-time values.

An example of a partially evaluated expression will now be described.

An expression can be seen as a tree, and some of its branches are fully evaluated. Any branch that contains fully evaluated as well as non-evaluated/partially evaluated branches would be considered partially evaluated.

Take the following equation, for instance.

$$a + (3 + 4)) + (b + (5 + 6))$$

$$\begin{array}{c} + \\ + \quad + \\ a \;(+) \; b \;(+) \\ 3 \; 4 \quad 5 \; 6 \end{array}$$

In the above example, the branches marked by (+) are fully evaluated. So (3+4) is fully evaluated and (5+6) is fully evaluated. However, (b+(5+6)) is partially evaluated, yet it is part of the whole expression. Thus, parts of the expressions themselves can be considered partially evaluated.

Figure 4:
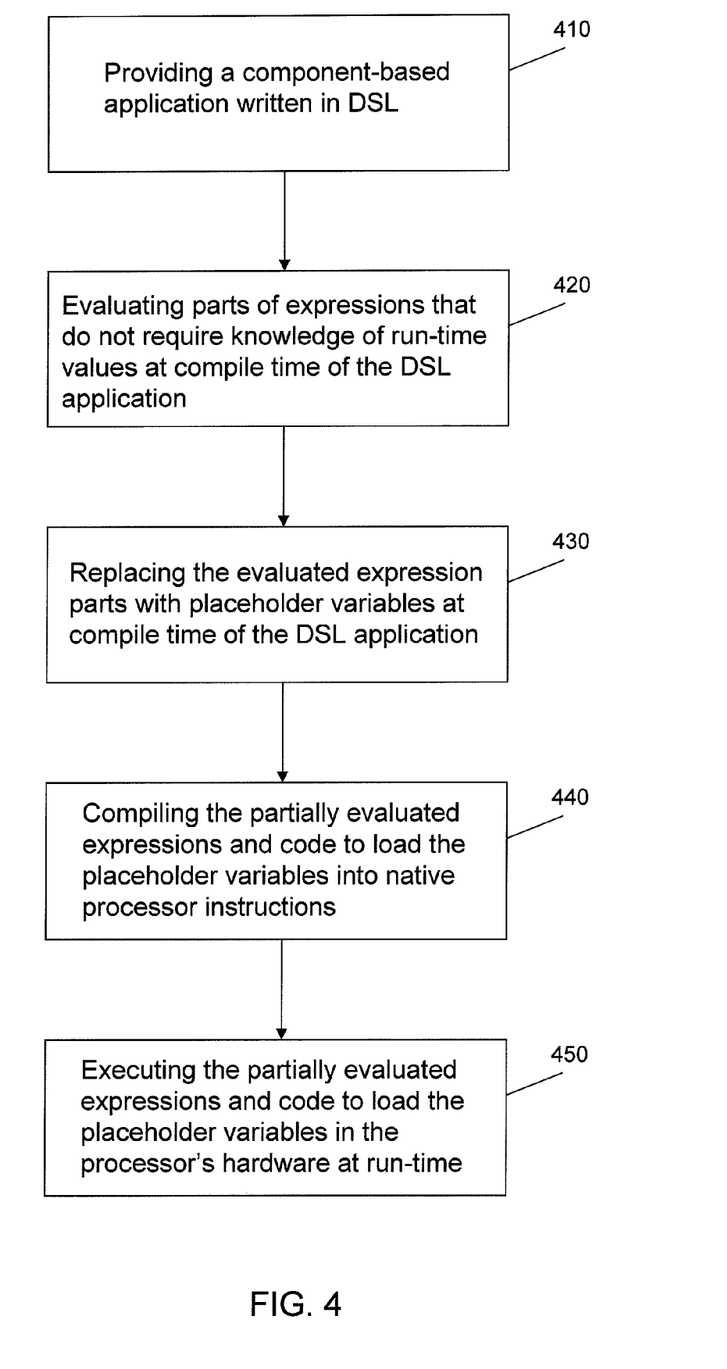
FIG. 4 is a third expression evaluation technique according to an exemplary embodiment of the present invention.

In the third expression evaluation technique according to an exemplary embodiment of the present invention, hereinafter referred to as the "fold & extract technique", as shown in FIG. 4, in response to providing a component-based application written in DSL (410) parts of expressions that do not require knowledge of run-time values are partially evaluated at compile-time (420). Also occurring at compile-time, the evaluated sub-expressions are replaced with placeholder variables whose values will be loaded at run-time (430). The resulting partially evaluated expressions and the code to load up the values of the placeholder variables contained within those expression are compiled into native processor instructions (440) and are executed by the processor's hardware at run-time (450). In this embodiment, the values of the placeholder variables are treated as input and are assigned to the placeholder variables at run-time during application start up.

This is an extension of the fold & embed technique, wherein the fundamental constraint with respect to compilation-time is alleviated by factoring out the literal values contained in the partially evaluated expressions by replacing them with variables. The values of the literals are carried through as input and are loaded into their corresponding variables at run-time. Take the following SPADE example:

```
stream<string name, int price> B = Functor(A)
    { param filter A.price >= pow(2,6); }
stream<string name, int price> C = Functor(A)
    { param filter A.price >= pow(2,5); }
```

The filter expressions in the above operator instances will be replaced with A.price>=$v1: ($v1, 64) and A.price>=$v1: ($v1, 32), respectively.

The first part (A.price>=$v1) is the partially evaluated expression that has its literals replaced with variables. This expression will be directly embedded into the generated GPL code. Here, both operator instances will share the exact same code, thus the compilation time can be cut in half in this particular example. The second part (($v1, 64)) is the list of literals extracted from the expression and the names of the variables they are replaced with. This information will be loaded at run-time so that the variables can be initialized. In summary, the generated C++ code might look like as follows:

```
input:
    $v1 = 64 for op instance 1
    $v1 = 32 for op instance 2
code:
    int const $v1 = load("$v1");
    ...
    bool filter = $port0.get_price( ) >= $v1;
```

The fold & extract approach can be further improved by putting all expressions into a normalized order, such that the structural differences in expressions do not always render the optimizations useless. For instance:

$$5 + x + 6 \to 5 + 6 + x \to 11 + x \to \$v1 + x: (\$v1, 11)$$

$$8 + 6 + x \to 14 + x \to \$v1 + x: (\$v1, 14)$$

In the above example, note the re-ordering (in bold) is performed to put the first expression in the same order as the second one, taking advantage of commutativity of the addition operator. While this helps with increasing the number of cases where code sharing can be applied, ultimately this approach cannot handle expressions that differ in their operations, non-literal symbols, or in their normalized structure. An example is:

$$X.a*Y.b+3$$

$$X.b+Y.c*5$$

These expressions cannot be put into the same form, thus they cannot share code. In summary, compared to the embed technique and the fold & embed technique, this approach incurs significantly less overhead in terms of time-to-compile, whereas it performs equally well in terms of time-to-run, due to reliance on native instructions for evaluating the expressions. On the other hand, it might slightly increase the time-to-start-up due to the loading of the literals.

Figure 5:
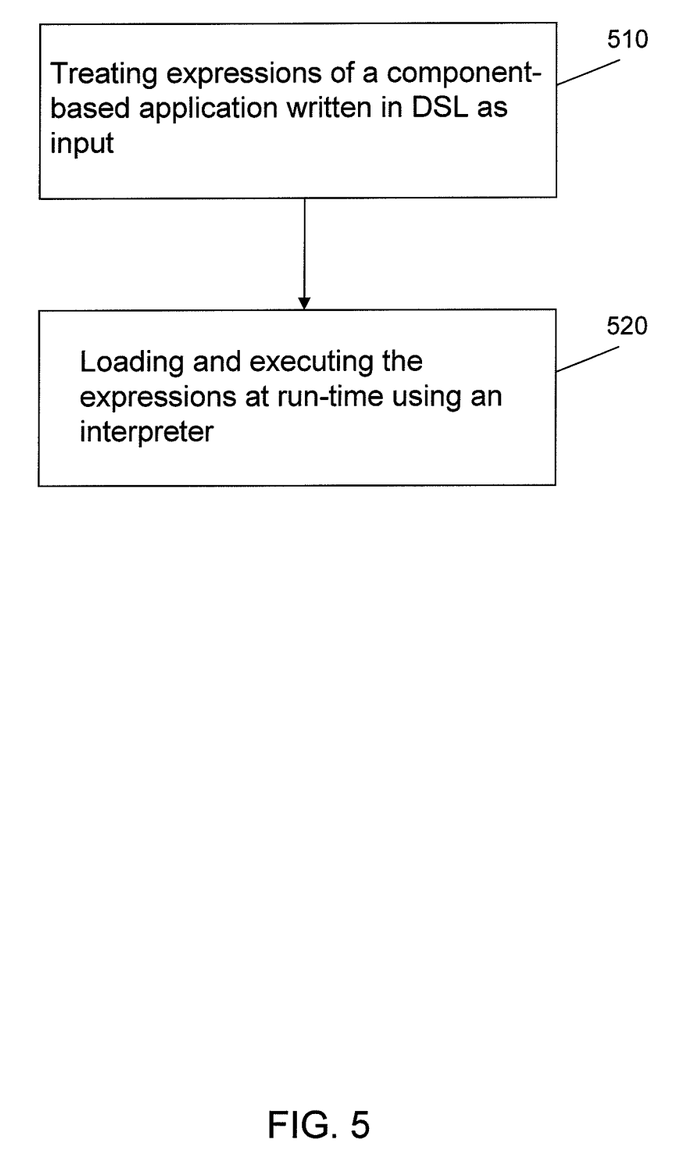
FIG. 5 is a fourth expression evaluation technique according to an exemplary embodiment of the present invention.

In the fourth expression evaluation technique according to an exemplary embodiment of the present invention, hereinafter referred to as the "interpret technique", as shown in FIG. 5, the expressions of a component-based application written in DSL are treated as input (510). At run-time, the expressions are loaded and executed using an interpreter (520).

This approach strives for minimizing the time-to-compile. In that regard, it treats a complete expression as input to an interpreter, which evaluates the expressions at run-time via interpretation. This involves parsing the expression at run-time and walking the resulting tree representing the expression and evaluating it whenever necessary. This also involves reading the run-time values that the expression depends on. The parsing aspect does not need to be repeated, and can be done once per expression. Here is a SPADE example:

```
stream<string name, int price> C = Barrier(A; B)
    { output C: price = A.price + B.price * 3; }
```

In the above example, we have the expression to be evaluated:

$$C.price=A.price+B.price*3$$

Using the interpret technique, this expression will be replaced with a placeholder variable and a call to an evaluation function in the interpreter, where the value of the placeholder variable is the string form of the expression and is loaded at run-time. More concretely, the generated C++ code may look like the following:

```
input:
$v1 = "$o1.price = $i1.price + $i2.price + 3"
Code:
string const $v1 = load("$v1");
...
Interpreter.Evaluate($v1, ituples, &otuple);
```

Here ituples is a list of input tuples, one from each port (A and B in the above example), and otuple is the output tuple to be populated based on the output attribute assignment expression.

The advantage of this approach is that, no matter what the assignment looks like for the output attributes, the generated code will look that same. However, executing the expressions involves making a call to the function Evaluate, which is an interpreter.

In summary, this approach achieves minimal time-to-compile, but has a high cost in terms of time-to-run. Compared to other approaches, time-to-start is also relatively high, due to the required loading of expression strings as well as the need for parsing them.

Figure 6:
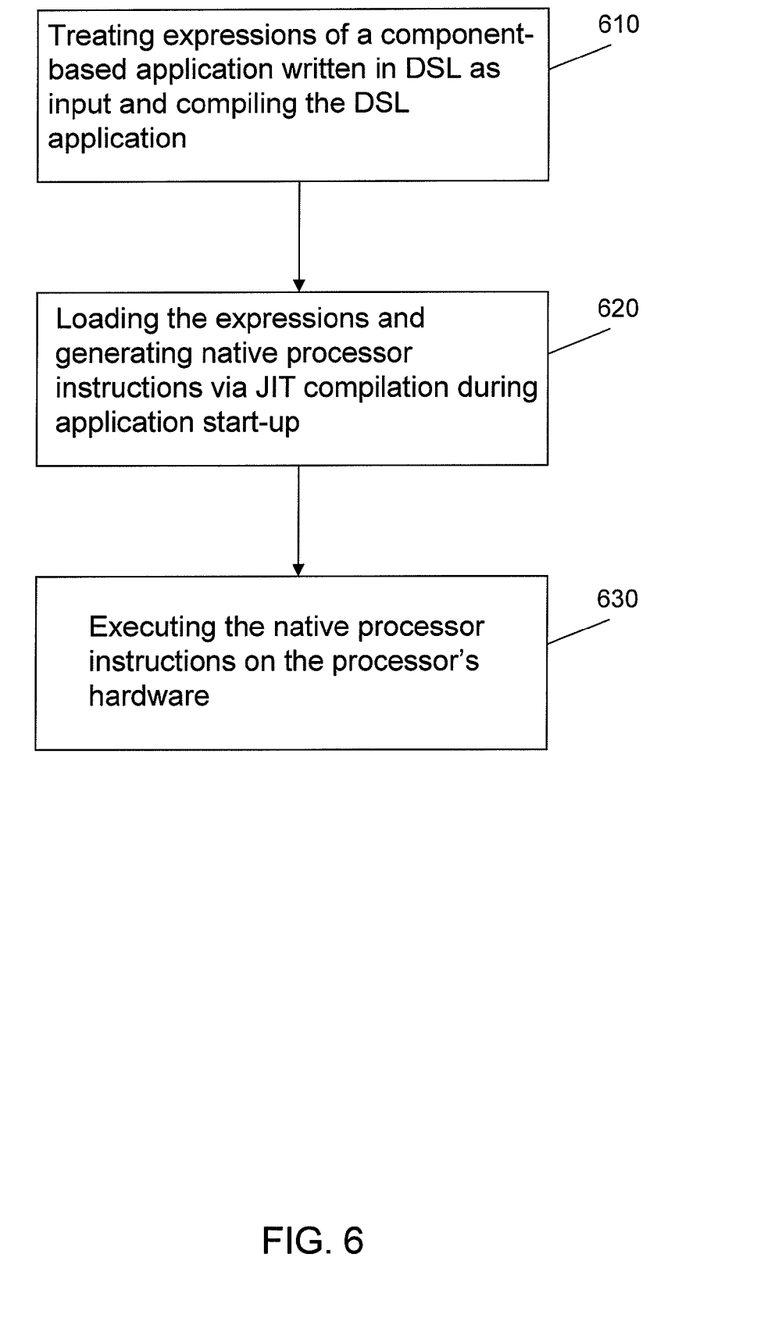
FIG. 6 is a fifth expression evaluation technique according to an exemplary embodiment of the present invention.

In the fifth expression evaluation technique according to an exemplary embodiment of the present invention, hereinafter referred to as the "jit-compile technique", as shown in FIG. 6, the expressions of a component-based application written in DSL are treated as input and compiled (610). At run-time, the expressions are loaded and native processor instructions are generated via just-in-time (JIT) compilation during application start-up (620). The generated code is then executed on the processor's hardware (630).

This approach improves upon the interpret technique with respect to time-to-run. The Evaluate function, when it is called for the first time for a given expression, performs native instruction generation at runtime to make the subsequent calls execute fast by utilizing the processor directly, with no interpretation involved. Note that, this comes at an increased cost with respect to time-to-start-up, as parts of the compilation process are delayed until run-time. This approach has good time-to-compile like the interpret technique, and its time-to-run can be potentially made comparable to that of the fold & extract approach, even though this requires a large amount of investment in JIT code generation and optimization.

Figure 7:
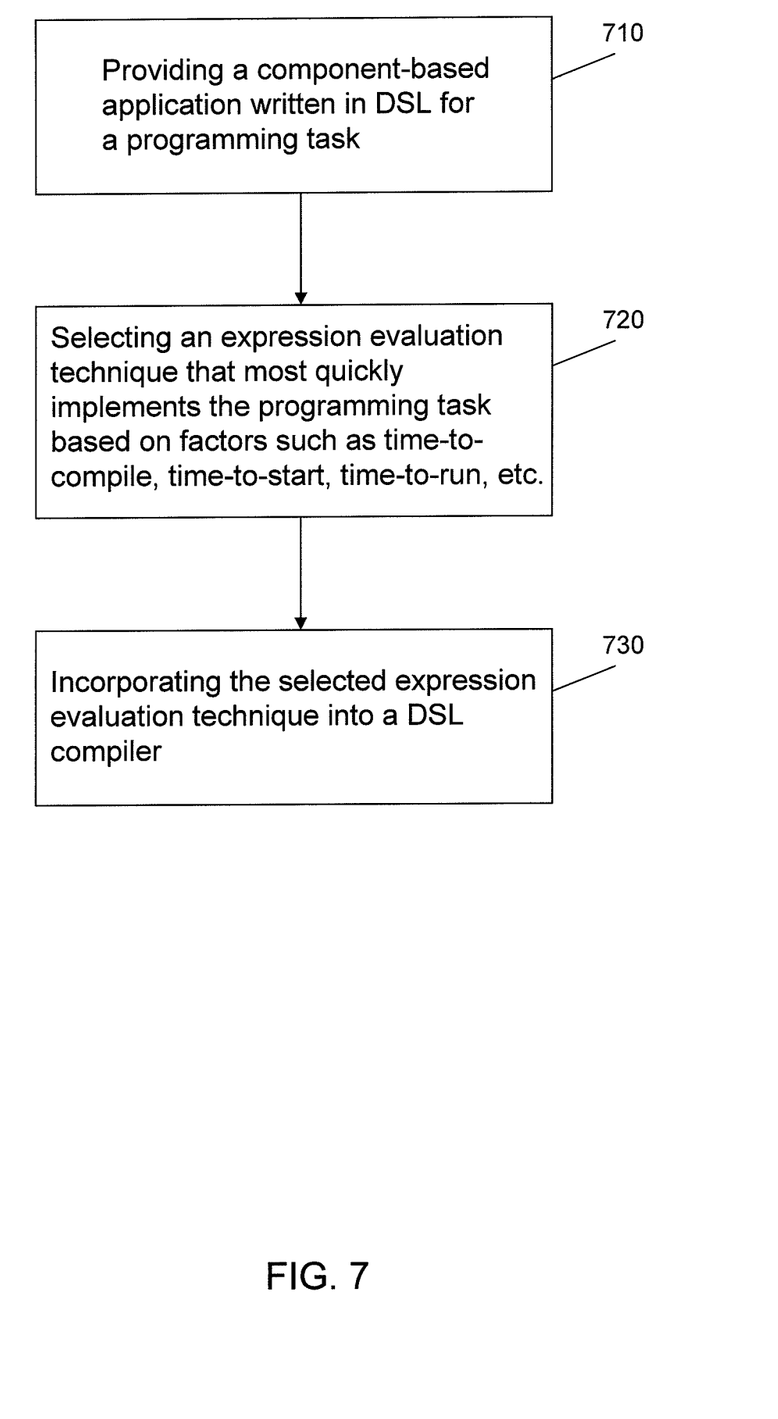
FIG. 7 is a framework for evaluating time-tradeoffs of differing domain-specific language (DSL) compilation approaches according to an exemplary embodiment of the present invention.

FIG. 7 is a framework for evaluating time-tradeoffs of DSL compilation approaches that embody the first through fifth expression evaluation techniques described above.

Figure 8:
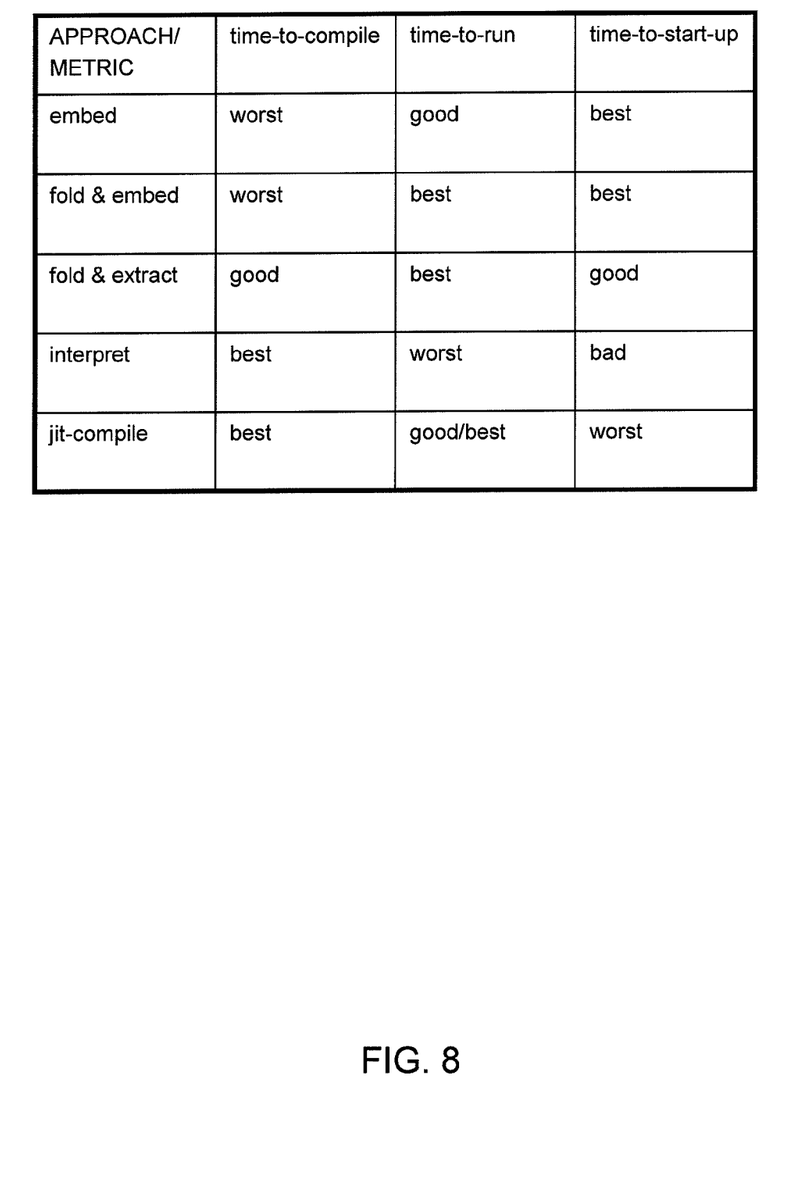
FIG. 8 is a table illustrating time-tradeoffs of each of the first through fifth expression evaluation techniques.
Figure 9:
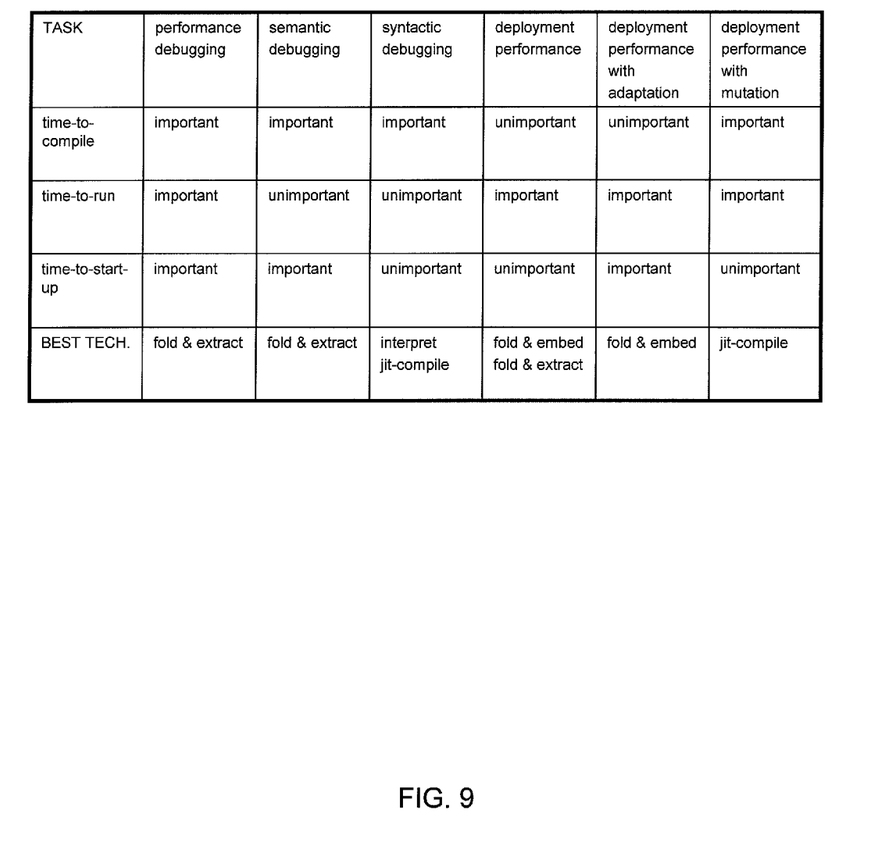
FIG. 9 is a table illustrating programming tasks and the best expression evaluation techniques for the programming tasks.

As shown in FIG. 7, there is provided a component-based application written in DSL for a programming task (710). The programming task may include, but is not limited to, performance debugging, semantic debugging, syntactic debugging, deployment performance, deployment performance with adaption or deployment performance with mutation. A description of these tasks will be provided later. Next, an expression evaluation technique that most quickly implements the programming task based on factors such as time-to-compile, time-to-start, time-to-run, etc. is selected (720). The selection process may be done manually or automatically. For example, a user could reference FIG. 9 that illustrates the best expression evaluation technique for the programming task-at-hand. In another example, the user may consult a table such as the one shown in FIG. 8 to determine a technique that may work well for many tasks. The selected expression evaluation technique is then incorporated into a DSL compiler (730). At this time, in accordance with the selected expression evaluation technique, the application may be compiled down to GPL and translated to machine code, loaded and made ready for execution (e.g., the application may be started) and an application task may be performed (e.g., the application may be run).

Provided below are descriptions of the programming tasks introduced above.

Performance debugging. This involves finding performance bottlenecks in an application. Like any debugging task, it requires a quick compile-run cycle (which means both time-to-compile and time-to-start up are important), but since the performance is the main focus of this type of debugging, the time-to-run is also important.

Semantic debugging. This involves finding problems with the application logic, thus the time-to-run is not important, whereas a quick compile-run cycle is required due to the debugging nature of the task.

Syntactic debugging. This involves finding problems with the syntax of the application code, thus the time-to-run and time-to-start-up are not important, whereas a quick compile-run cycle is required to check the validity of syntactic changes on the code.

Deployment performance. For long running applications that are performance sensitive, time-to-compile and time-to-start up are not relevant as they are amortized by the continuous and long-running nature of the applications.

Deployment performance with adaptation. When a long-running and performance-sensitive application also has adaptation requirements such as load balancing under changing workloads, dynamically launching more copies of certain pieces may become a necessity. This will elevate the importance of time-to-start-up compared to the case without adaptation.

Deployment performance with mutation. When a long-running and performance-sensitive application also has mutation requirements such as extensions via new functional pieces, dynamically launching modified pieces of the application may become a necessity. This requires recompilations at run-time and elevates the importance of decreasing the time-to-compile.

Figure 10:
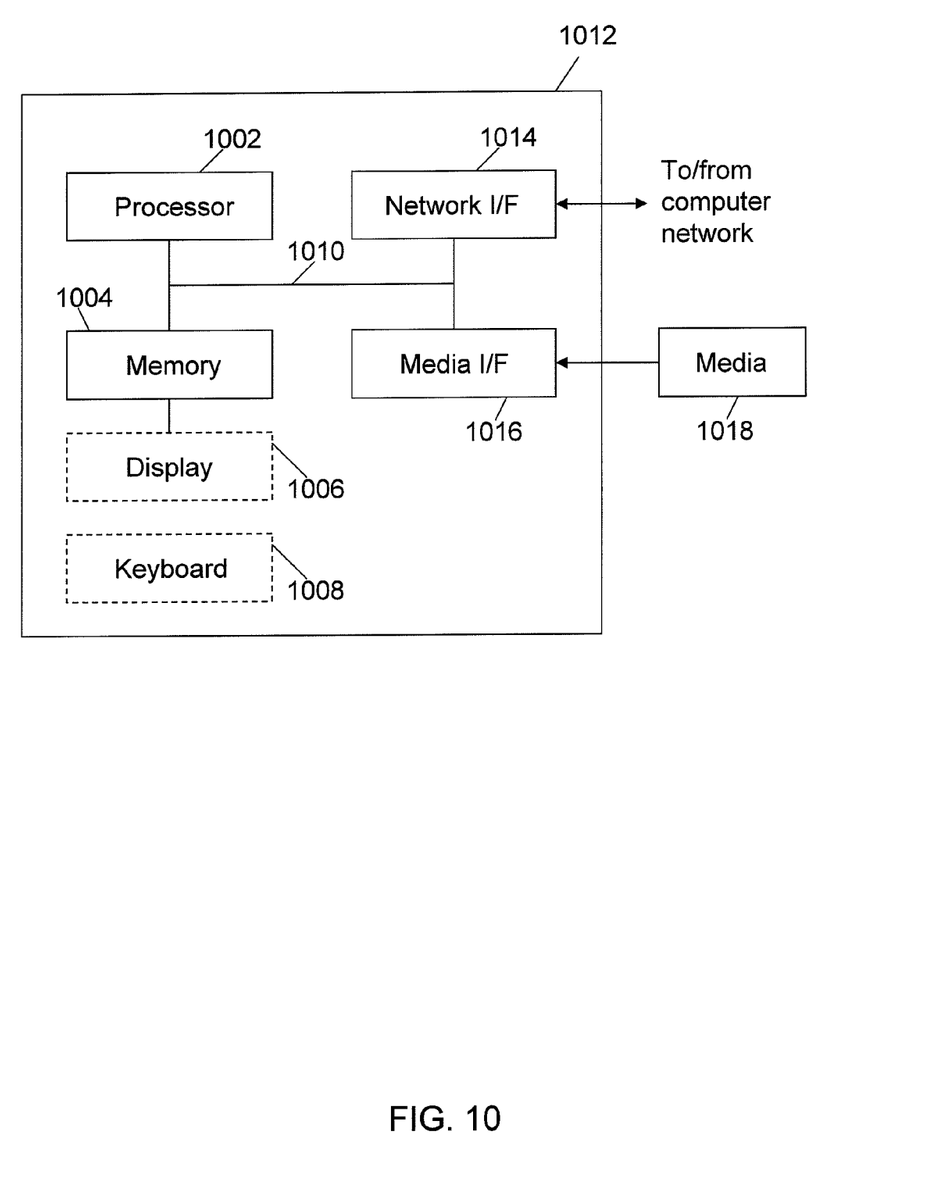
FIG. 10 illustrates a computer system in which exemplary embodiments of the present invention may be implemented.

An implementation of an exemplary embodiment of the present invention may make use of software running on a general-purpose computer or workstation. With reference to FIG. 10, such an implementation might employ, for example, a processor 1002, a memory 1004, and an input and/or output interface formed, for example, by a display 1006 and a keyboard 1008. The term "processor" as used herein is intended to include any processing device, such as, for example, one that includes a central processing unit (CPU) and/or other forms of processing circuitry. Further, the term "processor" may refer to more than one individual processor. The term "memory" is intended include memory associated with a processor or CPU, such as, for example, RAM, ROM, a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 1002, memory 1004, and input and/or output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing exemplary embodiments of the present invention may be stored in one or more of the associated memory devices (for example, read-only memory (ROM), fixed or removable memory) and, when ready to be utilized, loaded in part or in whole (for example, into random access memory (RAM)) and executed by a CPU. Such software could include, but is not limited to, firmware, resident software, microcode, and the like.

As shown in FIG. 10, examples of a computer readable medium having computer readable program code for carrying out aspects of the present invention embodied thereon may include media 1018 and memory 1004.

A data processing system suitable for storing and/or executing program code may include at least one processor 1002 coupled directly or indirectly to memory elements 1004 though a system bus 1010. The memory elements can include local memory employed during actual execution of the program code, bulk storage, and cache memories which provide temporary storage of at least some program code to reduce the number of times code must be retrieved from bulk storage during execution.

Input and/or output or I/O devices (including but not limited to keyboards 1008, displays 1006, pointing devices, and the like) can be coupled to the system either directly (such as via bus 1010) or through intervening I/O controllers.

Network adapters such as network interface 1014 may also be coupled to the system to enable the data processing system to become coupled to other data processing systems or remote printers or storage devices through intervening private or public networks. Modems, cable modem and Ethernet cards are just a few of the currently available types of network adapters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method executed by a processor, comprising:
providing an application written in a domain-specific language (DSL) for a programming task, wherein the application includes a plurality of components configured by expressions;
selecting from a plurality of techniques for evaluating the expressions a technique that most quickly implements the programming task; and
compiling the DSL application to generate general-purpose programming language (GPL) code in accordance with the selected expression evaluation technique, wherein when compiling the DSL application to generate GPL code, parts of expressions that do not require knowledge of run-time values are evaluated, the evaluated parts of the expressions are replaced with placeholder variables and partially evaluated expressions and code to load values of the placeholder variables are embedded into the generated GPL code, wherein the partially evaluated expressions comprise expressions including the evaluated expression parts that were replaced with the placeholder variables, the method further comprising:
compiling the generated GPL code into native processor instructions; and
loading the values of the placeholder variables and executing the partially evaluated expressions in response to running the native processor instructions.

2. The method of claim 1, wherein the selection of the technique is based on an amount of time the technique takes to compile the DSL application, an amount of time the technique takes to start the compiled application and an amount of time the technique takes to complete a task in the started application.

3. The method of claim 1, wherein when compiling the DSL application to generate GPL code, expressions that are used to parameterize the components are directly embedded into the generated GPL code and the method further comprises compiling the generated GPL code into native processor instructions.

4. The method of claim 1, wherein when compiling the DSL application to generate GPL code, parts of expressions that do not require knowledge of run-time values are evaluated and the partially evaluated expressions, which are those expressions including the evaluated expression parts, are embedded into the generated GPL code, the method further comprising:
  compiling the generated GPL code into native processor instructions; and
  executing the partially evaluated expressions in response to running the native processor instructions.

5. The method of claim 1, wherein when compiling the DSL application to generate GPL code, each of the expressions is replaced with a placeholder variable and a call to an evaluation function, the method further comprising:
  compiling the generated GPL code into native processor instructions;
  loading values of the placeholder variables in response to running the native processor instructions; and
  evaluating an expression in response to a run-time value of a placeholder variable of the expression changing.

6. A method executed by a processor, comprising:
  providing an application written in a domain-specific language (DSL) for a programming task, wherein the application includes a plurality of components configured by expressions;
  selecting from a plurality of techniques for evaluating the expressions a technique that most quickly implements the programming task; and
  compiling the DSL application to generate general-purpose programming language (GPL) code in accordance with the selected expression evaluation technique,
  wherein when compiling the DSL application to generate GPL code, each of the expressions is replaced with a call to an evaluation function and text of each of the expressions is stored in a placeholder variable, the method further comprising:
  compiling the generated GPL code into native processor instructions;
  loading values of the placeholder variables in response to running the native processor instructions; and
  in response to running the native processor instructions:
    when an evaluation function is called for the first time, compiling the expression stored in the placeholder variable into native processor instructions.

7. The method of claim 1, wherein the programming task comprises performance debugging, semantic debugging, syntactic debugging, deployment performance, deployment performance with adaptation or deployment performance with mutation.

8. The method of claim 1, wherein the DSL comprises a stream processing DSL.

9. A computer program product, comprising:
  a non-transitory computer readable storage medium having computer readable program code embodied therewith, the computer readable program code comprising:
  computer readable program code configured to receive an application written in a domain-specific language (DSL) for a programming task, wherein the application includes a plurality of components configured by expressions;
  computer readable program code configured to select from a plurality of techniques for evaluating the expressions a technique that most quickly implements the programming task; and
  computer readable program code configured to configure a compiler, which compiles the DSL application to generate general-purpose programming language (GPL) code, to use the selected expression evaluation technique,
  wherein in response to selecting an expression evaluation technique, the computer readable program code of the computer readable storage medium further comprises:
  computer readable program code configured to evaluate parts of expressions that do not require knowledge of run-time values;
  computer readable program code configured to replace the evaluated parts of the expressions with placeholder variables;
  computer readable program code configured to compile the DSL application to generate GPL code, wherein partially evaluated expressions and code to load values of the placeholder variables are embedded into the generated GPL code, wherein the partially evaluated expressions comprise expressions including the evaluated expression parts that were replaced with the placeholder variables;
  computer readable program code configured to compile the generated GPL code into native processor instructions; and
  computer readable program code configured to load the values of the placeholder variables and execute the partially evaluated expressions in response to running the native processor instructions.

10. The computer program product of claim 9, wherein the selection of the technique is based on an amount of time the technique takes to compile the DSL application, an amount of time the technique takes to start the compiled application and an amount of time the technique takes to complete a task in the started application.

11. The computer program product of claim 9, wherein in response to selecting an expression evaluation technique, the computer readable program code of the computer readable storage medium further comprises:
  computer readable program code configured to compile the DSL application to generate GPL code, wherein expressions that are used to parameterize the components are directly embedded into the generated GPL code; and
  computer readable program code configured to compile the generated GPL code into native processor instructions.

12. The computer program product of claim 9, wherein in response to selecting an expression evaluation technique, the computer readable program code of the computer readable storage medium further comprises:
  computer readable program code configured to evaluate parts of expressions that do not require knowledge of run-time values;
  computer readable program code configured to compile the DSL application to generate GPL code, wherein partially evaluated expressions, which are those expressions including the evaluated expression parts, are embedded into the generated GPL code;
  computer readable program code configured to compile the generated GPL code into native processor instructions; and
  computer readable program code configured to execute the partially evaluated expressions in response to running the native processor instructions.

13. The computer program product of claim 9, wherein in response to selecting an expression evaluation technique, the computer readable program code of the computer readable storage medium further comprises:
  computer readable program code configured to compile the DSL application to generate GPL code, wherein each of the expressions is replaced with a placeholder variable and a call to an evaluation function;

computer readable program code configured to compile the generated GPL code into native processor instructions;

computer readable program code configured to load values of the placeholder variables in response to running the native processor instructions; and computer readable program code configured to evaluate an expression in response to a run-time value of a placeholder variable of the expression changing.

14. A computer program product, comprising:

a non-transitory computer readable storage medium having computer readable program code embodied therewith, the computer readable program code comprising:

computer readable program code configured to receive an application written in a domain-specific language (DSL) for a programming task, wherein the application includes a plurality of components configured by expressions;

computer readable program code configured to select from a plurality of techniques for evaluating the expressions a technique that most quickly implements the programming task; and computer readable program code configured to configure a compiler, which compiles the DSL application to generate general-purpose programming language GPL code, to use the selected expression evaluation technique, wherein in response to selecting an expression evaluation technique, the computer readable program code of the computer readable storage medium further comprises:

computer readable program code configured to compile the DSL application to generate GPL code, wherein each of the expressions is replaced with a call to an evaluation function and text of each of the expressions is stored in a placeholder variable;

computer readable program code configured to compile the generated GPL code into native processor instructions;

computer readable program code configured to load values of the placeholder variables in response to running the native processor instructions; and computer readable program code configured to compile the expression stored in the placeholder variable into native processor instructions in response to running the native processor instructions, when an evaluation function is called for the first time.

15. The computer program product of claim 9, wherein the programming task comprises performance debugging, semantic debugging, syntactic debugging, deployment performance, deployment performance with adaptation or deployment performance with mutation.

16. The computer program product of claim 9, wherein the DSL comprises a stream processing DSL.

* * * * *